INFORMATION HANDLING DEVICE

Filed Feb. 24, 1964 3 Sheets-Sheet 1

INVENTOR.
WILLIAM G. DALY, Jr.
BY Robert J. Zinn
ATTORNEY

Dec. 20, 1966 W. G. DALY, JR 3,293,419

INFORMATION HANDLING DEVICE

Filed Feb. 24, 1964 3 Sheets-Sheet 2

INVENTOR.
WILLIAM G. DALY, Jr.

BY

ATTORNEY

INFORMATION HANDLING DEVICE

Filed Feb. 24, 1964 3 Sheets-Sheet 3

INVENTOR.
WILLIAM G. DALY, Jr.
BY
ATTORNEY

United States Patent Office 3,293,419
Patented Dec. 20, 1966

3,293,419

INFORMATION HANDLING DEVICE

William G. Daly, Jr., Lexington, Mass., assignor to Honeywell Inc., a corporation of Delaware Filed Feb. 24, 1964, Ser. No. 346,965
16 Claims. (Cl. 235—159)

This invention relates to new and useful improvements in electronic digital computers and more particularly to apparatus for performing mathematical operations. More specifically, the present invention is concerned with a new and improved apparatus for manipulating numbers so that the number of steps to be performed in the manipulation will be minimized to thereby decrease the time in which the operation can be performed.

In data processing systems, the carrying out of certain mathematical functions can be extremely time-consuming due to the large number of steps required in order to effect the desired operation. Multiplication of a pair of binary numbers is typical of the type of time-consuming operation in point. Among the many known techniques for effecting multiplication in a digital computer is the multiple storage and selection technique wherein multiplication is effected by generating multiples of a multiplicand and storing these. Thereafter, the digits of a multiplier are successively processed with each multiplier digit effecting the selection of a previously generated and stored multiple. As each multiple is selected it is dropped into the adder portion of an accumulator and added therein to the previously selected and stored values. The resultant sum, more properly designated as the partial product, is shifted one position and another multiple corresponding to the succeeding multiplier digit is dropped into the accumulator to effectively complete one cycle of operation. The multiplication procedure continues in this manner until all the multiplier digits have been processed.

It is readily apparent that hardware considerations required to store all combinations of respective multiples can be quite extensive, especially for apparatus operative in the binary coded decimal or hexadecimal mode. In order to alleviate somewhat the hardware requirements of this type of apparatus, it has heretofore been proposed to generate and store only selective multiples of an operand. Additional means are then provided to combine preselected multiples in certain combinations so as to form the multiples not already stored. Such an apparatus will be found in the invention of Henry W. Schrimpf, bearing Serial Number 636,256, filed January 25, 1957, now Patent 3,201,762. The savings in hardware for implementing this alternative mode of operation are appreciable; however, the time considerations required to effect the combination of the selected multiples may be prohibitive especially in scientific computation where speed of operation is of the essence.

It is accordingly a primary object of this invention to provide an improved electronic computing apparatus including means to generate and store selective multiples of an operand and subsequently, without any appreciable time delay or additional hardware, generate additional multiples of said operand as they are required.

It is another more specific object of the invention to provide an improved electronic computing apparatus including means to perform multiplication and division according to a multiple storage and selection technique in which selective multiples of the multiplicand or divisor are stored and from which additional multiples are essentially simultaneously generated in accordance with the successive digits of a multiplier, or dividend or portion thereof.

Still another object of the invention is to provide new and improved apparatus for implementing the foregoing object, which apparatus comprises a minimum amount of hardware and which apparatus is adapted to operate in a minimum time.

In one embodiment of the invention, means are provided for processing information in a cyclically operable computer wherein numbers are represented in the binary coded hexadecimal form. Accordingly, a multiplication operation is effected by first introducing a multiplicand into an accumulator register, the latter being associated with an adder whereby selective multiples of the multiplicand are generated. The selective multiples, as generated, are transferred to, and stored in, a multi-channel storage unit. The multiplier is next introduced into a precessing register with the low-order hexadecimal digit thereof being transferred directly into a selector circuit for selecting the respective channels of the multiplicand storage unit associated with the respective multiplier digits. Logic means associated with the selector circuit are provided for generating, as required, the additional multiples of the multiplicand from those selective multiples previously generated and stored.

As the successive digits of the multiplier are processed through the precessing register the associated multiples of the multiplicand are selected or generated in the above-mentioned logic circuitry and then transferred to the adder wherein they are added with other multiples similarly selected and applied during subsequent operative cycles. The low-order hexadecimal digit of the resultant sum is transferred directly from the adder into the high-order hexadecimal digit position of the precessing storage unit, the remaining digits being transferred to the storage section of the accumulator.

The advantages and improvements of the present invention will be readily appreciated in terms of time saved in the generation of selective multiples of a multiplicand in a multiplication operation since the prestoring of a selective few of pregenerated multiples permits a complete table of multiples to be directly read out therefrom.

For a better understanding of the invention, its advantages and specific objects attained with its use, reference should be had to the accompanying drawings and descriptive matter in which there is illustrated and described a preferred embodiment of the invention. Although the preferred embodiment of the present invention, as hereinafter described, is in terms of a specific utilization of selective multiples of an input operand in a multiplication operation, it should be noted that the basic concept of multiple generation and utilization is much broader, being equally applicable in a variety of applications including division, conversion, extraction of square roots, and the like.

Figure 1:
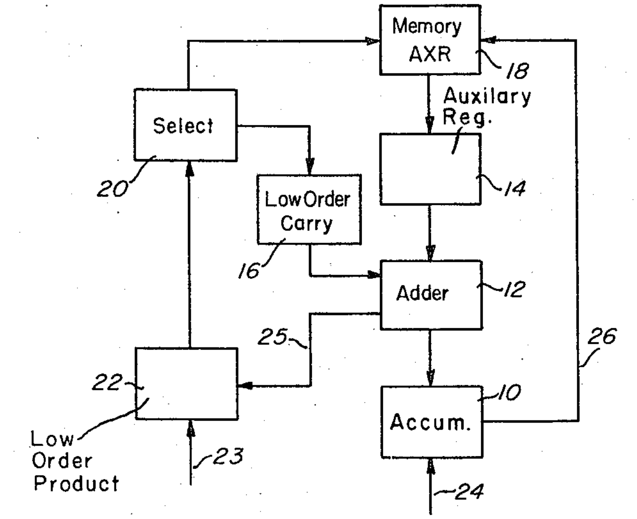
FIGURE 1 is a diagrammatic representation of the invention.

Referring first to FIGURE 1 therein is shown in diagrammatic fashion the basic elements of an apparatus for multiplying a pair of binary coded hexadecimal numbers. The numeral 10 identifies an accumulation that serves as a multiplicand register into which the respective hexadecimal bits of a multiplicand are entered from a source, not shown. The multiplicand register may take the form of a series of interconnected bistable flip-flops having appropriate coupling circuits between the stages so that the register may be operated in a serial fashion for the purpose of examining one or more digits in the register. A representative form of a serial register will be found in the above-mentioned patent of Henry W. Schrimpf. In the event that optimum speed of operation is a requirement, the multiplicand register and the associated circuitry hereinafter described may be operative in the parallel mode whereby the respective digits of the multiplicand are simultaneously examined in which event the register may take the form for such registers as described in the text of R. K. Richards entitled "Arithmetic Operations in Digital Computers," D. van Nostrand Company, 1955. Alternatively, the multiplicand and associated registers may be operative in the parallel-serial-parallel mode as illustrated in the invention of Roy Reach et al. bearing Serial Number 843,719, filed October 1, 1959, now Patent Number 3,003,695.

The multiplication apparatus further includes an adder circuit 12 which, in a preferred embodiment of this invention, took the form of a 48-bit, high-speed parallel binary adder capable of producing the binary sum of two 48-bit operands in one pulse period or 250 nanoseconds. An adder suitable for use herein may be such as is described in the invention of Joseph F. Kruy, bearing Serial Number 293,007, filed July 5, 1963, now Patent Number 3,243,584.

Also associated with the input of the adder is an auxiliary register 14 and a low-order carry generator 16. The auxiliary register 14 serves as a buffer register between a memory 18 and the adder 12, and may be of the type utilized as the multiplicand register referred to above. The low-order carry generator 16 is part of the control equipment necessary to the implementation of the various modes of operation of the present invention, and may consist of a single-shot device such as a one-shot multivibrator which, when actuated, produces an output signal of predetermined magnitude for a finite period of time before returning to its quiescent mode, alternatively, a bistable device may be set or reset to indicate the presence or absence of a low-order carry signal respectively; such devices are common in the data processing art as presently practiced. A further understanding of the function of the low-order carry generator 16 will best be appreciated from a description of a complete multiplication apparatus and the operation thereof which is discussed below. Continuing with the description of the circuitry illustrated in FIGURE 1, it should be noted that the basic system further includes an address select means 20 associated with the memory 18 and the low-order digit portion of a multi-bit multiplier register 22 alternatively known as the low-order product register.

In a preferred embodiment of the present invention, the memory 18 comprises four words of storage each word being 48 bits in length and coded in the hexadecimal representation so that each word contains twelve 4-bit digits. Each memory word has associated therewith logic circuitry which enables the digital representation stored therein to be read out in a straight or shifted, complemented or non-complemented manner. By selectively using this logic circuitry, it is thus possible, through the use of a specific word from memory to form additional multiples of the word stored therein simply by shifting and/or complementing the digital representation of the word. Before considering in detail the structural features of a preferred embodiment of the memory, a more complete understanding of the function and operation of the memory 18 is deemed necessary and will be more fully explained in connection with FIGURES 2, 2A and 4 which show in diagrammatic form the logical implementation of a preferred embodiment of the memory unit.

Figure 2:
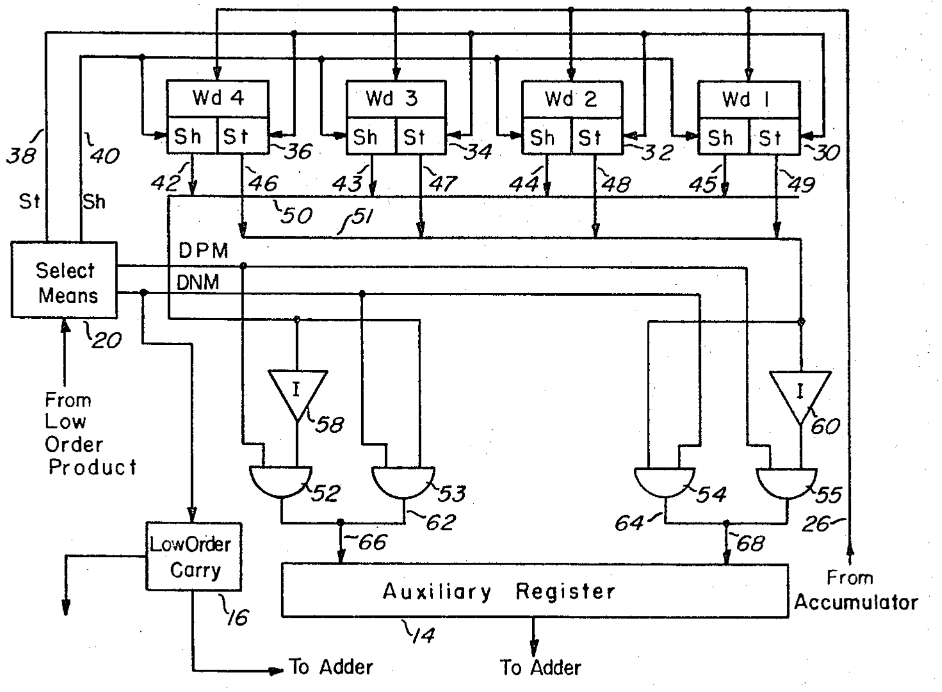
FIGURE 2 is a diagrammatic representation of a portion of FIGURE 1 with an elaboration on the details thereof.
Figure 2A:
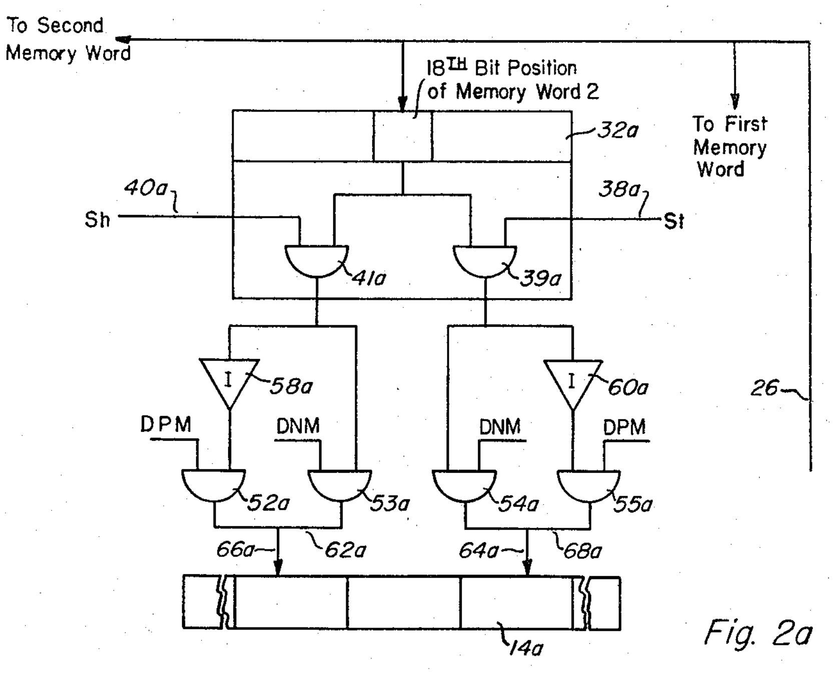
FIGURE 2A is a modification of FIGURE 2 with further elaboration on the details thereof.
Figure 4:
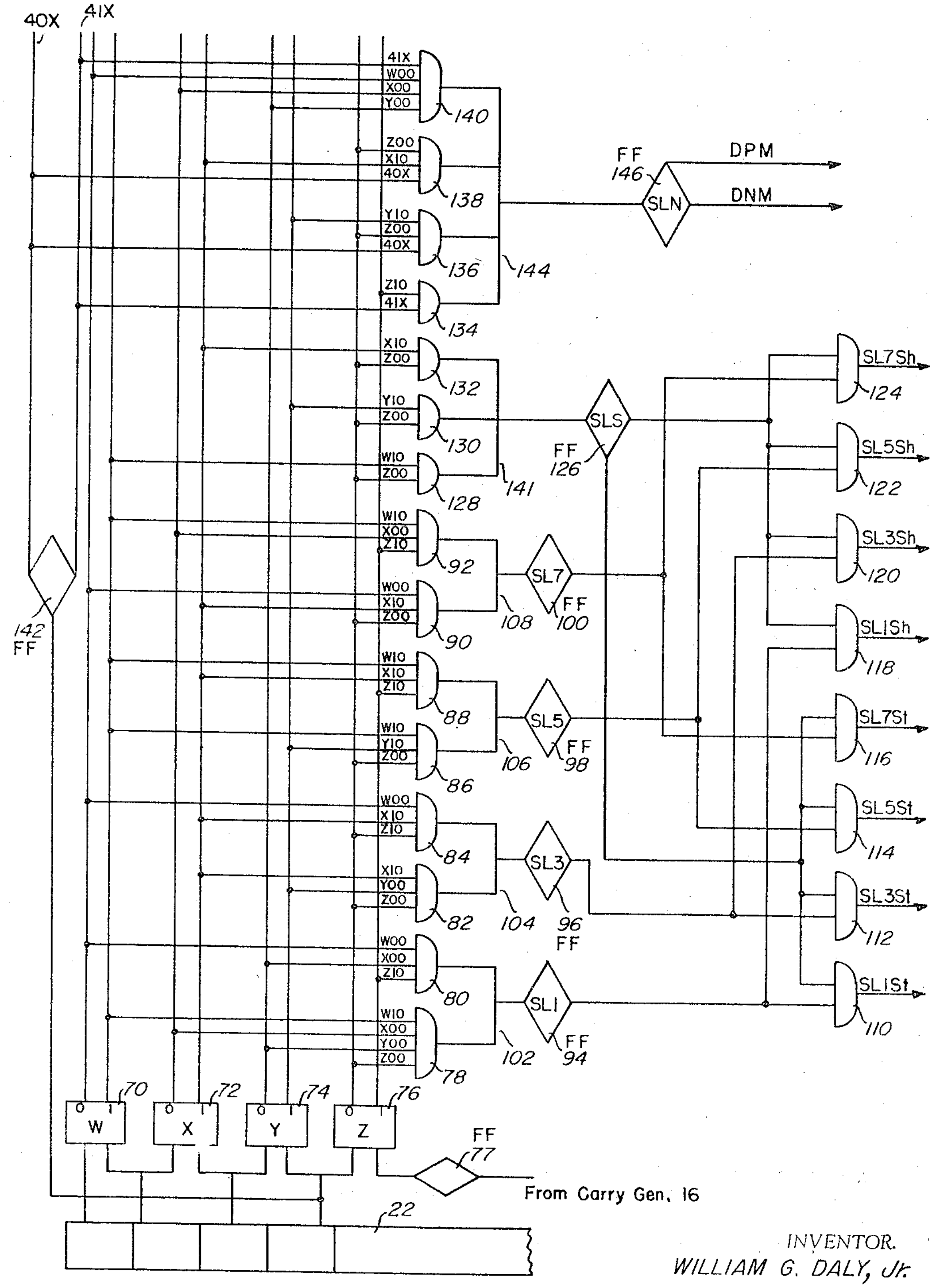
FIGURE 4 is a diagrammatic representation of the logic utilized which may be used to implement the Select Means of FIGURES 1, 2 and 2A.

However, before going into the details of FIGURES 2, 2A and 4 as they concern the multiples generation and selection, a review of the operative mode of the above-outlined apparatus is first made. In this respect, in the embodiment of FIGURE 1, a typical multiplication operation is initiated by introducing the multiplicand into the accumulator 10 via line 24. In a preferred embodiment of this invention, the multiplicand is introduced in a serial-parallel manner. Thus, three of the twelve hexadecimal digits are loaded in parallel in four successive or time-phased loading steps. After loading the multiplicand, and prior to the introduction of the multiplier, four selective multiples of the multiplicand are generated and stored in the assigned word locations of the memory 18. In one embodiment of the present invention the selective multiples are generated by transferring the digital representation of the multiplicand into the register 14 from whence it is transferred into the adder 12 and added to the number previously stored in the accumulator. The added result is then restored in the accumulator 10. By repeating this operation through successive cycles, a complete table of multiples may be generated with selected ones of the generated table of multiples being transferred directly into selected locations in the memory 18 via load line 26. In a more sophisticated embodiment of the multiple-generation portion of the present invention, the selective multiples are generated and stored in a period of two microseconds.

With the multiples of the multiplicand stored, the accumulator 10 and register 14 are cleared and the multiplier is introduced into the low-order product register 22. The loading of the multiplier over line 23 into the register 22 may also proceed in the serial-parallel mode whereby three hexadecimal digits are loaded in each of four successive time-phased cycles. Simultaneous with the loading of the multiplier, the low-order digit of the portion of the multiplier being loaded during each of the four successive cycles is sensed directly by sensing means associated with select means 20 whereby a select order is sent to the storage unit 18 to effect the transfer of the appropriate multiple or representation thereof to the register 14. The multiple so selected remains temporarily in the register 14 whereafter it is added in the arithmetic unit 12 to information previously stored in the accumulator 10, this information being zero in the first adding cycle.

The resultant sum is transferred from the adder 12 and stored in the accumulator 10 except for the low-order digit thereof which is immediately shifted via line 25 into the high-order character position of the low-order product register 22. The high-order digit of the multiplier previously occupying this position is shifted one position left in accordance with the normal operation of the precessing type register. This completes one operative cycle in the multiplication process, successive multiplier bits being treated in this manner unitl all the multiplier digits have been processed.

As noted above, each storage position of the memory 18 has associated therewith a characteristic word shift wired therein with each bit position thereof having appropriate logic means to effect a readout in straight or shifted representation and additional means to complement or not complement the straight or shifted readout. Thus, the first word position has a characteristic 3-bit left shift; the second word position has a 2-bit left shift, and the third and fourth word positions both have a 1-bit left shift.

In the preferred embodiment of the present invention, selective multiples of the multiplicand are generated and stored as soon as the A operand is received; the operation being effected simultaneously with the introduction of the B operand. In order to effect this, the multiplicand is loaded into memory word positions one, two and three. As set out above the third memory word position has associated therewith a 1-bit left shift, thus a shift readout appears as a 2's multiple of the multiplicand. Adding this to the value stored in the accumulator 10 in successive cycles generates the 3, 5 and 7 multiples which, along with the previously available 1's multiple, are loaded into their appropriate word positions of memory 18 to provide the 1's, 3's, 5's and 7's multiple in the first, second, third and fourth word positions respectively. Once the selective multiples of the multiplicand have been generated and stored, additional multiples may be generated therefrom as required and in accordance with the select technique to be hereinafter described.

A direct shift readout operation is used to generate the 8, 10, 12 and 14 multiples of the multiplicand from the prestored multiplicand multiples of 1, 5, 3 and 7 respectively. Thus, in binary notation the pre-established 3-bit left shift of 1's multiple in the first word position is equivalent in binary notation to multiplication by 8 so that by logically performing such a shift, an 8's multiple of the prestored 1's multiple may be generated.

Similarly, a 12's multiple of the multiplicand may be generated by shifting the 3's multiple of the multiplicand two places left. As an example for a multiplicand of 15, the 3's multiple, in straight binary notation, will appear as 101101. When this latter number is shifted left two places, the result appears as 10110100 which, when converted to decimal notation, appears as 180, which is 15 multiplied by 12.

The remaining multiples of the multiplicand are generated by taking the 2's complement of the multiples generated by the shift readout or direct readout techniques. The 2's complement of a binary coded number is formed by subtracting the number from all one bits and adding one to the low-order digit of the difference. The adding of the one to the difference is known as an end around borrow, and will hereinafter be referred to as a low-order complement carry. The low-order complement carry is one of two distinguishable carry signals generated in the carry signal generator 16 in response to a complement signal from select means 20. The second carry signal is necessary to increment the succeeding multiplier digit after a complement action has been taken and will henceforth be known as a low-order, inter-digit carry signal.

Accordingly, a 2's multiple may be generated from a 7's multiple by a shift readout complemented. Thus, a 7's multiple of a binary coded decimal 1 appears as 0111 which, when shifted one place left, transforms into 1110. Forming the 2's complement of the shifted representation results in the number 0010 which is the desired 2 multiple. Utilizing the shift readout complemented technique on the 3 and 5 multiples in the manner outlined above results in the generation of the 4 and 6 multiples respectively.

The 9's multiple of a binary number may be generated by a straight readout complemented operation on the 7's multiple of the binary number stored in the fourth word position of memory 18. For example, the 7's multiple of a binary one appears in hexadecimal form as 0111 which is subtracted from all ones in the first step of the complementing operation, resulting in the representation 1000. This transforms into the desired result of 1001 when the low-order complement carry is allowed for. In a similar manner, the 11, 13 and 15 multiples are generated by a straight readout complemented operation on the 5, 3 and 1 multiples respectively.

The basic operation of the circuitry illustrated and described hereinafter will best be understood by first considering an example of a typical mathematical operation to be performed. In this respect, assume that in a multiplication operation, a multiplicand of decimal value 111 is to be multiplied by a multiplier of decimal value 472. In accordance with the general operating features of the present invention, the 1, 3, 5 and 7 multiples of the multiplicand are first generated and then stored in memory 18 in binary coded hexadecimal form. After the generation and storage of the selective multiples have been effected, the processing of the multiplier digits begins.

The first multiplier digit to be processed is a 2. In accordance with the principles of the present invention, the generation of a 2's multiple is effected through a 7's multiple shift readout complemented operation. Thus, in binary coded hexadecimal notation, the 7's multiple of the multiplicand is represented as 0000 0000 0000 0111 0111 0111 which, when shifted left one bit position, appears as 0000 0000 0000 1110 1110 1110

In effecting the 2's complement operation, the shifted representation is first subtracted from all ones to give 1111 1111 1111 0001 0001 0001 which, when consideration is given to the low-order complement carry, results in the hexadecimal representation

| 1111 | 1111 | 1111 | 0001 | 0001 | 0010 |
|---|---|---|---|---|---|
| (15) | (15) | (15) | (1) | (1) | (2) |

This number is added to the number already in the accumulator register 10 which, in the case of the processing of the first multiplier digit, is zero. The resultant sum is then restored in the accumulator register 10 with the exception of the low-order digit which is transferred directly into the high-order digit position of the low-order product register 22.

Since a complement operation was performed in processing the first multiplier digit, an inter-digit carry signal is available to increment the succeeding multiplier digit. Thus, the second multiplier digit which appears in the example as a 7, is actually treated as an 8's multiple. In accordance with the operative routine of the preferred embodiment of the present invention as outlined above, an 8's multiple is generated by a 1's multiple shift readout non-complemented. The 1's multiple, in hexadecimal notation, is stored in the first word position of the memory 18 as 0000 0000 0000 0001 0001 0001

As previously noted, the first word position of memory 18 has an inherent 3-bit left shift so that a shifted representation of the 1's multiple appears as 0000 0000 0000 1000 1000 1000

This number is to be added to the portion of the number generated in the preceding cycle and stored in the accumulator register 10 as 1111 1111 1111 0001 0001

The addition is effected in adder 12 and results in the intermediate sum 0000 0000 0000 0111 1001 1001 which is restored in the accumulator register 10 except for the low-order digit, a (9), which is transferred directly into the high-order character position of the precessing register 22.

Since the processing of the preceding multiplier digit did not involve a complement operation, the third multiplier digit is processed as originally represented, that is, as a binary coded hexadecimal 4. In accordance with the preferred embodiment of the present invention, the 4's multiple is generated as a 3's multiple shift readout complemented. Following the routine established for the generation of the 2's multiple above, the hexadecimal representation of the 3's multiple, namely:

0000 0000 0000 0011 0011 0011 when shifted two bits left and complemented transforms to 1111 1111 1111 0011 0011 0011

When this number is added to the number stored in the accumulator register 10, and taking into account the low-order complement carry, there results the partial product 1111 1111 1111 0011 1010 1101

The resultant sum is then restored in the accumulator register 10 with the exception of the low-order digit, a (13), which is transferred directly into the high-order character position of the precessing register 22. All of the multiplier digits have now been processed. However, since the processing of the preceding multiplier digit involved a complement operation, a low-order, inter-digit carry remains to be processed. Accordingly, the hexadecimal representation 0000 0000 0000 0001 0001 0001 is added to the number stored in the accumulator register 10 which results in the hexadecimal representation 0000 0000 0000 0100 1011

In accordance with the mode of operation established for the preferred embodiment of the present invention, this entire digital representation is stored in the accumulator register 10. These digits, along with those digits previously stored in the processing register 22, constitute the final answer, namely:

```
0000 0000 0100 1011 1101 1001 0010
  0    0    4  (11) (13)   9    2
```

This may be compared with the results obtained by a conventional multiplication routine expressed in hexadecimal form; namely:

```
            1   1   1
           ×4   7   2
           ----------
            2   2   2
        7   7   7
    4   4   4
    -----------------
    4 (11)(13)  9   2
```

Referring now to FIGURE 2, therein is shown in diagrammatic form the memory 18 of FIGURE 1. In accordance with the operation outlined above, selective multiples as generated are fed via line 26 to storage locations represented here as registers 30, 32, 34 and 36 corresponding in the described embodiment to memory words 1 through 4 respectively. Select means 20 is shown connected to control inputs on registers 30, 32, 34 and 36 via lines represented generally at 38 and 40. In the actual circuit each set of lines 38 and 40 represent means for effecting a straight or shifted readout of the digital representation stored in the associated memory register. Accordingly, a corresponding plurality of output lines 42 and 49 are provided to transfer the straight or shifted representation out of the associated storage locations. These outputs are buffered through OR gates 50 and 51 respectively, the output of each being passed alternatively through associated circuitry to AND gates 52 or 53 and 54 or 55 respectively. The AND gates 52, 53, 54 and 55 are conditioned by the signals DPM and DNM generated in the select means 20 which, among other things, determines whether the readout is to be transferred in a complemented or non-complemented manner. Included in the circuitry common to AND gates 52 and 55 are inverters 58 and 60, which effect the complementing of the shifted or straight readout representation of the memory word when the associated AND gate 52 or 55 is conditioned by select means 20. Also associated with the outputs of AND gates 52, 53, 54 and 55 are OR gates 62 and 64, the outputs of which are connected via lines 66 and 68 to different locations within the register 14.

Although the memory unit is shown herein as being connected to the register 14 by means of a single pair of lines 66 and 68, in actual practice each bit position of every memory register has associated therewith separate gating means connected to the register 14 to permit a transfer of information in accordance with its characteristic word shift. Reference is made in this respect to FIGURE 2A which discloses the gating means associated with the 18th bit position of the second memory word.

In accordance with the mode of operation discussed in conjunction with FIGURE 2 as applied to the information stored in the 18th bit position of the second memory word, a straight readout of the information stored therein would be effected by conditioning of AND gate 39a by a straight readout signal generated in select means 20 and directed on line 38a to the second memory word position. From AND gate 39a the output signal is delivered to inverter 60a. The reason for the inversion of the straight readout signal is that a natural inversion of the signal is an inherent characteristic of the memory call so that to effect a straight readout, the signal must be reinverted. This method of operation should not be viewed as a limitation on the present invention since it is simply a matter of choice which dictates this mode of implementation.

From the inverter 60a, the output signal is gated through logical AND circuit 55a, the latter being conditioned by a non-complement readout signal DPM generated in select means 20. The signal DPM may be literally interpreted as "drop positive multiple." Thereafter, the straight noncomplemented signal representation of bit-18 of the second memory word is transferred through OR gate 64a via line 68a to the 18th bit position of the register 14a.

Alternatively, a straight readout complement operation may be performed on the signal stored in the 18th bit position of the second memory word by generation of a complement signal DNM in select means 20. The signal DNM may be literally interpreted as "drop negative multiple. The latter complement signal is effective to condition AND gate 54a so that when AND gate 39a is properly conditioned by select means 20, a straight-complement representation of the signal, as originally stored in memory unit 32a, will be transferred to the 18th bit position of the register 14.

A similar operation may be initiated to effect the transfer of a shift readout representation of the information stored in the 18th bit position of the second memory word. In this respect, a shift readout signal generated in select means 20, and directed on line 40a to the second memory word will condition AND gate 41a to thereby initiate an output signal therefrom indicative of the signal representation of the 18th bit position of the second memory word. From AND gate 41a, the output signal is delivered to inverter 58a, from whence the output signal is gated through logical AND circuit 52a, the latter being conditioned by a non-complement readout DPM signal generated in select means 20. Thereafter, the shifted non-complemented signal representation of bit 18 of the second memory word is transferred through OR gate 62a via line 66a to the 20th bit position of register 14. The characteristic 2-bit left shift of the second memory word effected the transfers of the signal representation from the 18th bit position of the second memory word to the 20-bit position in register 14.

A shift readout complement operation is effected for the 18th bit position of the second memory word by generation within select means 20 of a shift readout conditioning signal to AND gate 41a and also a complement conditioning signal DNM to AND gate 53a. Thus, the signal representation of the 18th bit position of the second memory word will be transferred therethrough to the 20th bit position of the register 14 in a shifted complemented form.

In addition to conditioning AND gates 53 and 54 of FIGURE 2 for a complemented readout of the selected memory words, the complement select signal is also effective to condition the low-order carry generator 16 of FIGURE 1, to effect the addition of a hexadecimal one in the adder.

Figure 3:
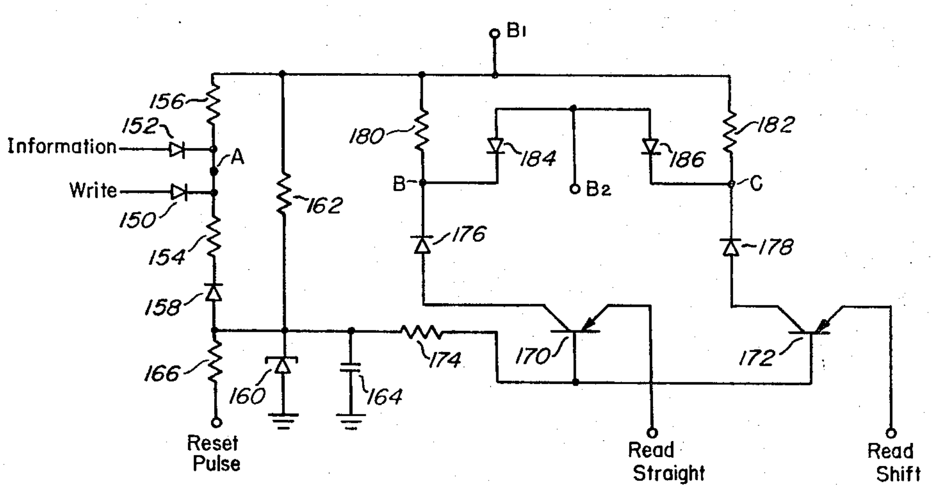
FIGURE 3 is a detailed circuit diagram of one practical embodiment of a memory cell and a portion of the logic utilized to implement the invention of FIGURES 1 and 2.

To complete the disclosure of the memory 18, reference is now made to FIGURE 3 which discloses what is, in essence, a basic memory cell of the memory unit as may be utilized in the preferred embodiment of the present invention. As noted above, each word of memory is comprised of a plurality of these memory cells corresponding to the bit locations of the multiplier digits comprising the respective memory words.

The input portion of the memory cell includes gating diodes 150 and 152 which are connected in an AND configuration and are conditioned to become operative upon concurrence of an information signal and a write signal from sources not shown. The information signal represents a particular bit value of a multiple of a multiplicand generated and stored in this memory cell in accordance with the teaching of this invention as outlined above.

Under normal operating conditions, and in the absence of concident write and information signals, diodes 150 and 152 will be maintained in a forward-biased condition. Associated with point A common to the cathodes of diodes 150 and 152 are resistance members 154 and 156. Resistor 154 is connected to the cathode of an isolation diode 158, the anode of which is further connected to a tunnel diode 160, which is in turn grounded through its anode.

A biasing source terminal $B_1$ in combination with resistance member 162 maintains the tunnel diode 160 continuously operative in its low-voltage, high-current state which will be considered as indicative of a binary zero in this particular application. Since the anode of the tunnel diode is at ground potential and the current drain is very low, the cathode will be maintained at essentially ground potential as well. In order to "set" the tunnel diode 160 to its high-voltage, low-current state, considered here to be indicative of a binary one, a coincidence of write and information pulses as applied to the anodes of diodes 150 and 152 must be established. As mentioned above, diodes 150 and 152 are normally forward-biased so that the anodes are held essentially at ground potential. This means that point A, common to the cathodes of diodes 150 and 152, will also be essentially at ground potential, as is the potential at the cathode of the tunnel diode 160. If now negative signals are simultaneously applied to the anodes of diodes 150 and 152, the potential of point A will rise sufficiently to forward-bias the diode 158, allowing a surge of current to pass through the tunnel diode 60, switching it into its high-voltage, low-current state.

If now the negative-going signals are removed from diodes 150 and 152, they will again become conductive so as to back-bias diode 158 below its threshold value; however, the tunnel diode 160 will remain in its second operative state. Capacitor 164 is provided to stabilize the switching of the tunnel diode and make it less responsive to transient signals generated internally of the circuit. A source of reset signals, not shown, is connected through resistor 166 to provide means for resetting the tunnel diode 160 to its first operating state after the completion of a select cycle.

The output portion of each memory cell includes transistors 170 and 172 which have their base electrodes connected in common through a parasitic suppression resistor 174 to the output of the tunnel diode 160. The emitter electrodes of transistors 170 and 172 are connected to "read straight" and "read shifted" drive lines respectively. The output legs of transistors 170 and 172 include their respective collector electrodes which are, in turn, connected through diodes 176 and 178, as well as resistance members 180 and 182, and thence to the biasing source $B_1$.

Straight or shifted output signals may be read off transistors 170 and 172 respectively at points B and C. These points are also common to a pair of clamping circuits consisting in part of diodes 184 and 186 and a second biasing source terminal B2. Diodes 184 and 186 of the clamping circuits are normally operative, thus holding points B and C at essentially a constant negative value established at terminal B2, thereby back-biasing diodes 176 and 178 so as to prevent spurious output signals. If now a read straight or read shifted signal is applied to either of the drive lines, and the tunnel diode 160 is in its second operative state, namely the high-voltage, low-current condition so as to bias sufficiently the base of the transistors 170 and 172, diode 176 or 178 respectively will become forward-biased and an output signal will be generated on either the straight or shift output line.

Reference will now be made to FIGURE 4 which discloses the subject matter of the copending application of Robert E. Broadbridge, filed February 24, 1964, and having Serial Number 346,970, and which relates in more specific detail to the select means 20 of FIGURES 1 and 2. The logic circuitry will generate the desired select signals in accordance with the nature of the four binary coded hexadecimal bits of the low-order multiplier digit in the multiplier register 22 and a signal from flip-flop 77 representing a low-order inter-digit carry generated in carry generator 16 during the processing of the preceding multiplier digit.

As shown herein, the four low-order bits of the multiplier register 22 are connected as inputs to associated EXCLUSIVE OR gates 70, 72, 74 and 76. The EXCLUSIVE OR gate is a well-known type of logic device which establishes an output signal when two input signals are of unlike sign. Thus, when two input signals are of unlike sign, an output signal will be generated. In the absence of any input signal, or in case both inputs are the same, no output is generated. For purposes of more clearly presenting the logic considerations involved in the generation of the various select signals, each EXCLUSIVE OR circuit is shown as having associated therewith a pair of output lines which carry one of two signal levels representing a 1 or 0 state, thereby indicating whether the gating conditions have been satisfied or not. The select logic for the various multiples is connected through AND gates 78, 80, 82, 84, 86, 88, 90 and 92, the output signals from the EXCLUSIVE OR gates 70, 72, 74 and 76 being selectively combined in these AND gates to operatively condition the latter and thereby selectively set flip-flops 94, 96, 98 and 100, the latter being connected to their associated AND gate through OR gates 102, 104, 106 and 108.

As an example, consider the setting of flip-flop 94, corresponding to the selection of a 1's multiple of the multiplicand by proper conditioning of AND gate 78. In this case, it is required that the output of EXCLUSIVE OR gate 70 be of the 1 level corresponding to unlike bits in the 1st and 2nd bit position of the low-order multiplier digit being scanned so that the alternative possible bit configurations 10 or 01 are established. This is represented in terms of a conditioning code at the input of AND gate 78 as W10. Referring now to a second conditioning lead of AND gate 78, there is shown in terms of the conditioning code, the representation X00. The corresponds to a zero output level of the EXCLUSIVE OR gate 72 which is conditioned by the 2nd and 3rd bits of the low-order multiplier digit being processed. According to the code representation, the interpretation of X00 is such that if the 2nd and 3rd bits of the multiplier digit are alike, there will be an output to X00. Now, since conditioning of AND gate 78 is dependent upon the 2nd and 3rd bits of the low-order multiplier digit being alike, and since the 2nd bit is also operative in the conditioning of the first EXCLUSIVE OR gate 70 wherein the permissible bit combinations were established as 10 and 01, the permissible combinations of the three bits are 011 and 100.

Similarly, the output of EXCLUSIVE OR gate 74 must be zero to establish the proper conditioning signal to AND gate 78 on input Y00. The dependence of the 3rd bit of the multiplier digit in the conditioning of both EXCLUSIVE OR gates 72 and 74, and the fact that the output of EXCLUSIVE OR gate 76 will be zero if both the 3rd and 4th bits of the multiplier digit are alike, limits the permissible combinations of the four bits of the multiplier digit to 0111 and 1000.

The final conditioning signal of AND gate 78 as applied on input Z00 is generated by a zero output from EXCLUSIVE OR gate 76 which is in turn predicated upon the sensing of a like condition existing between the 4th bit of the multiplier digit being sensed and the sensing of an inter-digit carry from the processing of a preceding multiplier digit as stored in flip-flop 77.

The fact that a zero condition from EXCLUSIVE OR gate 76 will be generated if both the 4th bit of the multiplier digit and the inter-digit carry signal from the preceding sensing cycle are the same, coupled with the interdependence of the fourth bit of the multiplier digit in EXCLUSIVE OR gates 74 and 76, limits the permissible combinations of input signals to the set of four EXCLUSIVE OR gates as 0111–1 and 1000–0.

Reconstructing, for purposes of further analysis, the representation W00 X00 Y00 Z00 as 0111 N or 1000 $\overline{N}$, N and $\overline{N}$ are to be interpreted as meanings that the inter-digit carry was or was not propagated respectively in the processing of the preceding multiplier digit. In decimal notation, the expression 1000 $\overline{N}$ will thus be translated as an 8, while 0111 N will be translated as a 7 with an inter-digit carry which signifies that the presently sensed 7 should be treated as an 8 insofar as the multiple selection is concerned.

The conditioning of AND gate 78 by the sensing of an 8 representation of the bits from the low-order multiplier digit or the equivalent 7 representation with an inter-digit carry in the manner described is consistent with the technique outlined earlier for generating the various multiples of the multiplicand since the 8's multiple is generated as a shift readout non-complemented of the 1's multiple.

A 1's multiple select signal is also generated by proper conditioning of AND gate 80, which conditioning is effected in a manner similar to that established above by selective ones of the four bits of the low-order multiplier digit being processed and the presence or absence of a signal indicating an inter-digit carry. As mentioned above, the output of AND gates 78 and 80 are buffered in OR gate 102 to effect the setting of the 1's multiple flip-flop 94. The output of the 1's multiple flip-flop 94, when set, is applied with a "straight" (ST) or "shift" (SH) signal, established in flip-flop 126 by its input logic including AND gate 128, 130 or 132. The conditioning of AND gates 128, 130 or 132 is effected in accordance with the sensing of selective ones of the multiplier bits.

The output of AND gates 128, 130 or 132 is buffered through OR gate 141 to set flip-flop 126 which is then effective in generating a shift readout signal which is combined with the select readout signal generated by flip-flops 94, 96, 98 or 100 in the AND gates 118, 120, 122 and 124. When flip-flop 126 is in its reset state, the select readout signal generated in flip-flops 94, 96, 98 or 100 is applied to one of the AND gates 110, 112, 114 or 116.

An additional consideration concerns the generation of a signal to effect the transfer of a positive or negative multiple, i.e. whether the selected multiple is to be transferred in straight or complemented manner. In this respect, AND gates 134, 136, 138 and 140 are conditioned to provide an output in accordance with the outputs of the EXCLUSIVE OR circuits 70, 72, 74 and 76 and the particular bit representation of the fourth bit of the low-order multiplier digit, as sensed by flip-flop 142. The output of AND gates 134, 136, 138 and 140 are gated through OR gate 144 to set, or reset, flip-flop 146 (SLN) thereby developing signals DNM or DPM respectively; the signals being used to operatively condition AND gates 50, 52, 54 or 56 of FIGURE 2.

The following table establishes the relationship between a multiple to be generated and the selected combination of conditioning signals responsible for the generation thereof. Included herein are the selection signals SL1, SL3, SL5 and SL7 indicative of the pregenerated and stored multiples available to effect the generation of the desired multiple; shift (SH) and straight (ST); and drop positive multiplicand (DPM) and drop negative multiplicand (DNM).

| Multiple | SL1 | SL3 | SL5 | SL7 | SH | ST | DPM | DNM |
|---|---|---|---|---|---|---|---|---|
| 1 | X | ---- | ---- | ---- | ---- | X | X | ---- |
| 2 | ---- | ---- | ---- | X | X | ---- | ---- | X |
| 3 | ---- | X | ---- | ---- | ---- | X | X | ---- |
| 4 | ---- | X | ---- | ---- | X | ---- | ---- | X |
| 5 | ---- | ---- | X | ---- | ---- | X | X | ---- |
| 6 | ---- | X | ---- | ---- | X | ---- | ---- | X |
| 7 | ---- | ---- | ---- | X | ---- | X | X | ---- |
| 8 | X | ---- | ---- | ---- | X | ---- | X | ---- |
| 9 | ---- | ---- | ---- | X | ---- | X | ---- | X |
| 10 | ---- | ---- | X | ---- | X | ---- | X | ---- |
| 11 | ---- | ---- | X | ---- | ---- | X | ---- | X |
| 12 | ---- | X | ---- | ---- | X | ---- | X | ---- |
| 13 | ---- | X | ---- | ---- | ---- | X | ---- | X |
| 14 | ---- | ---- | ---- | X | X | ---- | X | ---- |
| 15 | X | ---- | ---- | ---- | ---- | X | ---- | X |

Alternative arrangements for practicing the present invention suggest the implementation of the basic concept of multiples generation through combinations of straight or shift readout, complemented or non-complemented, with binary coded digital representations in octal form. An embodiment functioning in the octal mode requires only a pair of memory words and a corresponding lesser amount of hardware, the implementation of which is effected in the manner outlined above for the hexadecimal mode. In a suggested embodiment operative in the octal mode, the first word position of memory 18 would have wired therein a 2-bit left shift, while the second word positions would be characterized by a 1-bit left shift. In the practice, in a multiplication operations of the embodiment operative in the octal mode, a 1's multiple of the multiplicand would be stored in the first word position of memory, while the second word position would store the 3's multiple thereof.

In utilizing the above embodiment in the practice of a multiplication operation, a 1's multiple of the multiplicand would be stored in the first word position of memory, while the second word position would store the 3's multiple thereof. It would be possible to generate the 4's multiple by a 1's multiple shift readout non-complemented, while a 7's multiple would result from a 1's multiple straight readout complemented. In similar manner, a 6's multiple would result from a 3's multiple shift readout non-complemented, while a 2's multiple would be generated by a 3's multiple shift readout complemented. The remaining 5's multiple would be generated by a 3's multiple straight readout complemented.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. In a cyclically operable computer for performing multiplication with multi-digit numbers in a mode of operation wherein selective multiples of a multiplicand are generated and stored, additional multiples being generated essentially spontaneously from those previously stored in accordance with the value of respective, successive digits of a multiplier; including: means for storing said selective values of said multiplicand, means for generating said additional multiples of said multiplicand, said last-named means further comprising: means for transferring a signal representation of one of said selected multiples from said storage means to a digital data-receiving device, first means operatively conditioned by said transfer means to effect a straight transfer of said signal representation from said storage means, additional means operatively connected with said first means and conditioned by said transfer means to effect the transfer of said signal representation alternatively in a complemented or non-complemented representation; second means operatively conditioned by said transfer means to effect a shifted transfer of said signal representation from said storage means, further means operatively connected with said second means and conditioned by said transfer initiating means to effect the transfer of said shifted signal representation alternatively in complemented or non-complemented representation, means actuated in response to generation of a complemented signal representation to increment the succeeding multiplier digit, and further means actuated in response to generation of said complemented signal representation to transfer an indication thereof to said digital data receiving device whereby said additional multiples are generated from said previously stored multiples in accordance with the conditioning of said first or second means and whether the transfer is effected in said complemented or non-complemented representation.

2. An electronic calculator comprising: means for storing a multiple of a multiplicand, means for receiving a signal representation of said first multiple, first logic means for transferring said signal representation of said multiple of a multiplicand from said storage means to said receiving means in a straight and non-complemented manner, second logic means for transferring said signal representation of said multiple of said multiplicand from said storage means to said receiving means in a straight and complemented manner, third logic means for transferring said signal representation of said multiple of said multiplicand from said storage means to said receiving means in a shifted and non-complemented manner, fourth logic means for transferring said signal representation of said multiple of a multiplicand from said storage means to said receiving means in a shifted and complemented manner, and means to initiate the transfer of said signal representation in one only of said multiple logic means.

3. A multiplying arrangement in accordance with claim 2 wherein said straight and non-complemented signal representation of said multiple of a multiplicand as transferred by said first logic means is a 5's multiple of said multiplicand, said straight and complemented representation of said multiple of a multiplicand as transferred by said second logic means is an 11's multiple of said multiplicand, said shifted and non-complemented signal representation of said multiple of a multiplicand as transferred by said third logic means is a 10's multiple of said multiplicand, and said shifted and complemented signal representation of said multiple of a multiplicand as transferred by said fourth logic means is a 6's multiple of said multiplicand.

4. A multiplying arrangement in accordance with claim 2 wherein said straight and non-complemented signal representation of said multiple of a multiplicand as transferred by said first logic means is a 3's multiple of said multiplicand, said straight and complemented representation of said multiple of a multiplicand as transferred by said second logic means is a 13's multiple of said multiplicand, said shifted and non-complemented signal representation of said multiple of a multiplicand as transferred by said third logic means is a 12's multiple of said multiplicand, and said shifted and complemented signal representation of said multiple of a multiplicand as transferred by said fourth logic means is a 4's multiple of said multiplicand.

5. A multiplying arrangement in accordance with claim 2 wherein said straight and non-complemented signal representation of said multiple of a multiplicand as transferred by said first logic means is a 7's multiple of said multiplicand, said straight and complemented representation of said multiple of a multiplicand as transferred by said second logic means is a 9's multiple of said multiplicand, said shifted and non-complemented signal representation of said multiple of a multiplicand as transferred by said third logic means is a 14's multiple of said multiplicand, and said shifted and complemented signal representation of said multiple of a multiplicand as transferred by said fourth logic means is a 2's multiple of said multiplicand.

6. A multiplying arrangement in accordance with claim 2 wherein said straight and non-complemented signal representation of said multiple of a multiplicand as transferred by said first logic means is a 1's multiple of said multiplicand, said straight and complemented representation of said multiple of a multiplicand as transferred by said second logic means is a 15's multiple of said multiplicand, and said shifted and non-complemented signal representation of said multiple of a multiplicand as transferred by said third logic means is an 8's multiple of said multiplicand.

7. An electronic calculator including means for storing a multi-digit number, means for receiving a signal representation of said multi-digit number, first logic means for transferring said signal representation of said multi-digit number from said storage means to said receiving means in a straight and non-complemented manner, second logic means for transferring said signal representation of said multi-digit number from said storage means to said receiving means in a straight and complemented manner, third logic means for transferring said signal representation of said multi-digit number from said storage means to said receiving means in a shifted and non-complemented manner, fourth logic means for transferring said signal representation of said multi-digit number from said storage means to said receiving means in a shifted and complemented manner, and means to initiate the transfer of said signal representation in one only of said multiple logic means.

8. An electronic calculator in accordance with claim 7 in which said multi-digit number is in octal code.

9. An electronic calculator in accordance with claim 7 in which said multi-digit number is in hexadecimal code.

10. In a cyclically operable computer for performing multiplication with binary coded multi-digit numbers in a mode of operation wherein selective multiples of a multiplicand are generated and stored, additional multiples subsequently being generated from said previously stored multiples in accordance with respective digits of a multiplier, including the combination of a plurality of multi-position storage means for storing said selective multiples, means for selectively generating said additional multiples of said multiplicand, said last-named means further comprising: means for transferring a previously selected multiple into said plurality of positions of said multi-position storage means, a plurality of output lines associated with each of said plurality of positions of said multi-position storage means, each of said plurality of output lines serving to operatively connect each of said plurality of positions of said multi-position storage means to a corresponding plurality of bit positions of a digital information receiving device, means operatively connected with each of said plurality of said positions of said multi-position storage means for transferring digital information out of said storage means on any of said plurality of output lines, means operatively connected to each of said plurality of output lines, said last-named means including further means for reading information on said output line in either normal or complemented fashion; whereby said additional multiples are generated from said previously stored multiples in accordance with which of the plurality of output lines is energized and whether the information is read out in normal or complemented fashion.

11. A cyclically operable computer in accordance with claim 10 including means actuated in response to generation of a complement readout signal to increment the preceding multiplier digit and further means actuated in response to generation of said complement readout signal to transfer an indication thereof to said digital data receiving device.

12. In a cyclically operable computer for performing multiplication which includes means for providing a plurality of electric signals representing respectively each of the plurality of different multiples of a multiplicand comprising: means for storing preselected ones of said plurality of multiples, means for selecting one of said preselected and stored multiples of said multiplicand for generating additional multiples therefrom, said last-named means further comprising: means for selecting a first multiple representation of said multiplicand including first gating means conditioned by a straight readout signal, the output of said first gating means operatively connected to a first inverter, second gating means operatively connected to the output of said first inverter and conditioned by a non-complement signal, said second gating means further connected to the input of a digital data-receiving device capable of accepting a straight binary representation of said multiplicand; means for generating a second multiple representation of said multiplicand including third gating means conditioned by a shift readout signal, the output of said third gating means operatively connected to a second inverter, fourth gating means operatively connected to the output of said second inverter and conditioned by a non-complement signal, said fourth gating means further connected to the input of said digital data-receiving device which is so conditioned to receive a shifted representation of said original multiple; means for generating a third multiple representation of said multiplicand including said first gating means conditioned by a straight readout signal, the output of said first gating means operatively connected to fifth gating means, said fifth gating means conditioned by a complement signal, means connecting said fifth gating means to the input of said digital data-receiving device which is so conditioned to receive a straight-complemented representation of said original multiple; and means for generating a fourth multiple representation of said multiplicand including said third gating means operatively connected to sixth gating means, said sixth gating means conditioned by a complement signal, means connecting said sixth gating means to the input of said digital data-receiving device which is so conditioned to receive a shifted and complemented representation of said original multiple.

13. A multiplying arrangement in accordance with claim 12 wherein said first multiple representation as conditioned by said straight non-complemented readout signals is a 5's multiple of said multiplicand, said second multiple representation as conditioned by said shifted non-complemented readout signals is a 10's multiple of said multiplicand, said third multiple representation as conditioned by said straight complemented readout signals is an 11's multiple of said multiplicand, and said fourth multiple representation as conditioned by said shifted complemented readout signals is a 6's multiple of said multiplicand.

14. A multiplying arrangement in accordance with claim 12 wherein said first multiple representation as conditioned by said straight non-complemented readout signals is a 3's multiple of said multiplicand, said second multiple representation as conditioned by said shifted non-complemented readout signals is a 12's multiple of said multiplicand, said third multiple representation as conditioned by said straight complemented readout signals is a 13's multiple of said multiplicand, and said fourth multiple representation as conditioned by said shifted complemented readout signals is a 4's multiple of said multiplicand.

15. A multiplying arrangement in accordance with claim 12 wherein said first multiple representation as conditioned by said straight non-complemented readout signals is a 7's multiple of said multiplicand, said second multiple representation as conditioned by said shifted non-complemented readout signals is a 14's multiple of said multiplicand, said third multiple representation as conditioned by said straight complemented readout signals is a 9's multiple of said multiplicand, and said fourth multiple representation as conditioned by said shifted complemented readout signals is a 2's multiples of said multiplicand.

16. A multiplying arrangement in accordance with claim 12 wherein said first multiple representation as conditioned by said straight non-complemented readout signals is a one's multiple of said multiplicand, said second multiple representation as conditioned by said shifted non-complemented readout signals is an 8's multiple of said multiplicand, and said third multiple representation as conditioned by said straight non-complemented readout signals is a 15's multiple of said multiplicand.

No references cited.

MALCOLM A. MORRISON, *Primary Examiner.*

I. FAIBISCH, *Assistant Examiner.*